(12) United States Patent
Honegger

(10) Patent No.: US 7,658,053 B2
(45) Date of Patent: Feb. 9, 2010

(54) METHOD AND DEVICE FOR PACKAGING FLAT ARTICLES

(75) Inventor: Werner Honegger, Bach (CH)

(73) Assignee: Ferag AG, Hinwil (CH)

( * ) Notice: Subject to any disclaimer, the term of this patent is extended or adjusted under 35 U.S.C. 154(b) by 130 days.

(21) Appl. No.: 11/569,846

(22) PCT Filed: May 26, 2005

(86) PCT No.: PCT/CH2005/000297

§ 371 (c)(1),
(2), (4) Date: Dec. 7, 2006

(87) PCT Pub. No.: WO2005/118402

PCT Pub. Date: Dec. 15, 2005

(65) Prior Publication Data

US 2007/0209323 A1    Sep. 13, 2007

(30) Foreign Application Priority Data

Jun. 2, 2004    (CH) .................................... 932/04

(51) Int. Cl.
*B65B 9/00* (2006.01)
(52) U.S. Cl. .................... 53/450; 53/548; 53/374.5
(58) Field of Classification Search ............... 53/374.5, 53/450, 479, 548, 550; 156/515; 493/197
See application file for complete search history.

(56) References Cited

U.S. PATENT DOCUMENTS

| 3,498,019 A * | 3/1970 | Rait ............................. 53/450 |
| 3,522,135 A * | 7/1970 | Page ............................. 53/550 |
| 3,553,059 A * | 1/1971 | Stohlquist ..................... 156/515 |
| 3,727,365 A * | 4/1973 | Stohlquist ..................... 53/450 |
| 3,782,072 A * | 1/1974 | Sorensen et al. ............... 156/515 |
| 3,850,780 A * | 11/1974 | Crawford et al. ............... 53/550 |
| 3,943,686 A * | 3/1976 | Crawford et al. ............... 53/550 |
| 4,048,003 A * | 9/1977 | Bolli ........................... 156/515 |
| 4,073,116 A | 2/1978 | Glover |
| 4,305,240 A * | 12/1981 | Grevich et al. ................. 53/550 |
| 4,341,057 A * | 7/1982 | Limousin ..................... 53/374.5 |

(Continued)

FOREIGN PATENT DOCUMENTS

DE    2651131    5/1977

(Continued)

*Primary Examiner*—Louis K Huynh
(74) *Attorney, Agent, or Firm*—Rankin, Hill & Clark, LLP

(57) ABSTRACT

A method for packaging flat articles, whereby the flat articles (1), when in a transport flow (3), are covered on both sides by a packaging material (2a, 2b) and a welding beam (11) establishes cross-connections between subsequent articles (1) in an upper area (2a) and a lower area (2b) of the packaging material. Welding beams (11) are provided with at least one resilient hold-down element (12a, 12b) each which brings the packaging material (2a, 2b) to be processed into a defined position. The hold-down element (12a, 12b) compresses the packaging material (2a, 2b) before the welding beam contacts the packaging material (2a, 2b) and executes a processing operation such as welding or pressing. The transport flow, in the area of processing, is transported by means of a support belt which exerts a force countering the forces exerted by the hold-down elements (12a, 12b) and the welding beam (11).

23 Claims, 2 Drawing Sheets

U.S. PATENT DOCUMENTS

| | | | |
|---|---|---|---|
| 4,433,527 A * | 2/1984 | Ramsey et al. | 53/374.5 |
| 5,054,269 A * | 10/1991 | Leino | 53/550 |
| 5,131,973 A * | 7/1992 | Feldkamper | 156/555 |
| 5,197,262 A * | 3/1993 | Katz et al. | 53/550 |
| 5,447,486 A * | 9/1995 | Anderson et al. | 493/197 |
| 6,178,719 B1 * | 1/2001 | Hansen | 53/550 |
| 6,574,944 B2 * | 6/2003 | Capodieci | 53/450 |
| 7,059,103 B2 * | 6/2006 | Ninomiya et al. | 53/450 |
| 7,325,373 B2 * | 2/2008 | Boldrini et al. | 53/550 |

FOREIGN PATENT DOCUMENTS

| | | |
|---|---|---|
| DE | 19509232 | 9/1996 |
| EP | 0712782 | 5/1996 |
| GB | 716783 | 10/1954 |
| GB | 1054644 | 1/1967 |
| WO | 2004/018297 | 3/2004 |

* cited by examiner

METHOD AND DEVICE FOR PACKAGING FLAT ARTICLES

BACKGROUND OF THE INVENTION

1. Field of the Invention

The invention lies in the field of packaging technology and relates to a method and to a device. The method and device serve for packaging flat objects, for example individual printed products, from stack-like groups of printed products or from stack-like groups of printed products and other flat objects, such as for example CDs, flat pattern objects or flat pattern bags.

2. Description of Related Art

It is known to package flat objects of the above mentioned type with the help of a quasi endless packaging material web (e.g. plastic film or paper web supplied from the roll). Thereby, such a packaging material web is applied around the objects which are conveyed one after the other and distanced to one another, or a packaging material web is fed to such a row on both sides. The packaging material web (or webs) in the longitudinal direction on the upper side of the row or laterally thereto is closed in longitudinal seams, and in transverse seams between, in each case, two successive objects transversely to the longitudinal direction. As the case may be, the objects which are enclosed on all sides by packaging material are separated from one another directly after the creation of the transverse seams or also simultaneously with this.

With the application of plastic film as a packaging material, the longitudinal and transverse seams are usually created by way of welding, wherein the separation of the packaged objects may be carried out simultaneously with the creation of the transverse seams. With the application of paper as a packaging material, an adhesive, activatable by heat, may be deposited onto the packaging material directly before the feeding of the packaging material web to the row of objects to be packed, at the locations of the longitudinal and transverse seams, so that the seams may then be created with means which are similar as is the case with welded seams on plastic packaging. It is possible to close the seams by way of embossing or by way of other known methods which are matched to the applied packaging material.

For such processing operations such as welding, bonding etc. . . . , the printed products are conveyed in streams into a processing station and conveyed out of this again. The processing station is advantageously designed in a manner such that the conveying of the packaged objects does not need to be interrupted for the processing, but is able to be continuously operated. This means that processing tools which are to act on the printed products to be packaged over a defined time, must also be conveyed with the stream of conveyed objects to be processed during this time, and in a manner such that they have no relative speed with respect to the printed product, at least in the conveying direction. The material layers to be connected must simultaneously be located in a defined position to one another, before and during the processing or connection, so that a connection or seam may be achieved without any faults.

A processing device is moved in an intermittent manner according to EP 0712 782 A1. The processing device consists of a welding and separating device with a welding beam and a counter-beam in the transverse direction of a stream of conveyed objects, as well as deflection rollers which lead a conveyor belt around the deflection rollers. The processing device has the same speed and movement direction as the stream of conveyed objects in a first phase of the movement beginning in a start position, and the processing takes place by way of welding and separating a packaging tape. In a second phase, the processing device moves back against the stream of conveyed objects to the start position, and is opened, so that the stream of conveyed objects is not affected. The intermittent movement necessitates a corresponding control effort, an energy expense and a loading of the material, corresponding to the constant alternating loading of the moved parts. It is particularly the cycle speed of the device which is limited on account of the intermittent movement. In the case that the objects to be packaged are relatively thick, with greater belt tensions, a correspondingly larger gap is present between the upper and the lower packaging layer, and for example, a welding may not be carried out in a reliable manner. If the belt tension is lower, then the packaging material, as the case may be, lies in a loose manner between the objects, and its arrangement may no longer be controlled, in particular at higher speeds, which may likewise lead to poor connections.

A packaging device is disclosed in DE 26 51 131 A1 with which two welding jaws fastened in each case on a shaft are arranged in the transverse direction on both sides of a conveyor path. The welding jaws are not directed to the conveyor path in the idle position. For welding, the welding jaws are rotated counter to one another, press against a packaging bag from both sides, and rotate further away from one another. This, in each case, is effected in an intermittent and jerky manner, synchronized with the position of the objects to be packaged. Here too, in principle, the same stresses and limitations occur on account of the intermittent movement. The problem of the unclear position of the packaging material also remains the same.

A rotating processing drum is suggested in WO 2004 018 297, in order to achieve a uniform, i.e. non-intermittent movement of processing tools. The stream of conveyed objects runs around this drum, and thereby the drum is wrapped by a pressing tape which presses the stream of conveyed objects against the tools, in order, for example, to permit a welding. Although the position of the packaging material is defined by way of this, however a complication of the device results due to the wrapping of the drum by the stream of conveyed objects. The stream of conveyed objects, after the deflection around the processing drum as a rule needs to be deflected back again into the initial direction. Additional belts rollers and drives are required for this, and the space requirement for the complete device is increased.

It is therefore the object of the invention to provide a method and a device for packaging flat objects of the initially mentioned type, which overcomes the disadvantages discussed above.

BRIEF SUMMARY OF THE INVENTION

This object is achieved by a method and a device for packaging flat objects with the features of the respective independent patent claims.

It thus comprises processing means such as, for example, welding beams or pressing bows which are moved together with a stream of conveyed objects, in each case at least one resiliently deflecting hold-down means which brings the packaging means to be processed into a defined position to one another. Thereby, the hold-down means by way of exerting a force, presses the upper web of the packaging material against a lower web and moves these against one another or presses them together, before the processing means comes into contact with the packaging means and executes a processing operation such as welding and pressing.

The processing means may be led to a stream of conveyed objects moved linearly and at a high speed thanks to the hold-down means, wherein the packaging webs are brought into a defined position, and permit a proper connection.

In a preferred embodiment of the invention, the processing means comprises first hold-down means as well as second hold-down means, which are arranged in the movement direction in each case in front of and after the processing means respectively, and are resiliently connected to the processing means. The position of the packaging webs becomes even better defined by way of this. Furthermore, a hold-down means trailing the processing means serves for fixing a subsequent part of the stream of conveyed objects and prevents this from remaining on the processing means, for example on a welding beam. The trailing hold-down means further supports the conveying of the stream of conveyed objects.

In a further preferred embodiment of the invention, the stream of conveyed objects in the region of the processing is conveyed by a support belt which exerts a force on the stream of conveyed objects which is counter to the forces exerted on the stream of conveyed objects by the hold-down means and the processing means. Thereby, the processing means and the support belt move in the same direction at essentially the same speed. The support belt is preferably not supported in the processing region, and is thus guided via rollers only outside the processing region. The support belt has a certain compliance perpendicular to the belt surface by way of this, and is slightly deflected by the hold-down means and processing means, by which means positioning inaccuracies are compensated. The support belt, with the exception of this compliance in the processing region, runs essentially in a straight manner. Advantageously in each case, only one processing means is in contact with the stream of conveyed objects, and no wrapping of several processing means arranged in a drum-like manner with a corresponding change in the movement direction of the stream of conveyed objects is required. Instead, the support belt runs essentially tangentially to a revolving path of the processing means.

Thus, no rigid, hard counter-beam is used, be it moving or stationary, and the conveyor belts do not have to be interrupted for receiving such a counter beam. Relatively heavy parts such as the welding beam are led onto the stream of conveyed objects from only one side, whilst the support belt runs on the other side.

Inaccuracies may also be caused by way of a resilient or compliant mounting of the processing means, alternatively or additionally to the compliance of the support belt. The direction of the compliance lies essentially perpendicular to the movement direction of the processing means.

Preferably, the support belt has a compliant or compressible damping layer. This is compressed by the effect in particular of the processing means. By way of this, a contact surface and a contact duration for a welding and pressing is increased, and furthermore—in contrast to an undamped belt—high-frequency disturbing noises are avoided.

The support belt for welding applications, preferably, has an outer coating of heat-resistant material, for example Teflon. By way of this, on the one hand the core of the belt is protected, and on the other hand, a detachment of freshly welded material locations from the belt is simplified. Otherwise, the danger exists of the objects sticking to the packaging material on the belt, and interrupting the production by way of this.

In a further preferred variant of the invention, several processing means are in each case driven and moved, preferably together, in each case with a uniform, thus non-intermittent movement. The several processing means, at preferably uniform distances one after the other, are led past at an initial location to the stream of conveyed objects at essentially the speed of the stream of conveyed objects, led along the stream of conveyed objects, wherein the processing operation is carried out, subsequently led back past the initial location on a return path.

The processing means are, thus, formed on a movement means for the continuous movement along a revolving path, said revolving path bringing the processing means in contact with the stream of conveyed objects in the processing region. A loading and energy loss of irregular movements is avoided by way of the uniform movement, and thus high cycle rates are possible.

For example, a plurality of processing means may be conveyed on an essentially oval revolving path, for example, by way of a chain-like mounting as a movement means. The revolving path thereby has a straight-lined section to which the processing means may be led at essentially the speed of the stream of conveyed objects, wherein the hold-down means engage the stream of conveyed objects. The processing means are led parallel to the stream of conveyed objects along the straight-lined section, and the processing operation is carried out. The region of the parallel guiding thus forms a processing region. The processing means are subsequently led back on a return path.

In a preferred embodiment of the invention, the processing means are assembled on a drum and are movable in a circular path, wherein a conveying direction of the stream of conveyed objects runs essentially tangentially to a circular path corresponding to the end points of the processing means.

This embodiment of the invention is based on the surprising recognition that a comparatively short processing time is sufficient for certain processing procedures such as welding for example, and thus extremely high production runs are possible despite the tangential course of the stream of conveyed objects.

Several such drums may be assembled on a common shaft, and several streams of conveyed objects running parallel and next to one another may be processed in this manner. The processing means on the parallel part drums thereby are arranged with the same phase or however offset to one another.

The processing means in the known manner are designed, for example, as welding beams for welding thermoplastic packaging material, or for the combined welding and separation. In other embodiments of the invention, a processing means is merely a pressing bow for pressing prepared adhesive locations together, or a knife beam for separating units of a stream of conveyed objects, or comprises means for high-frequency welding or ultrasonic welding.

With the welding of thermoplastic plastic films as a packaging material, one may achieve production runs of, for example, up to 40,000 per hour.

Further preferred embodiments are to be deduced from the dependent patent claims. Thereby the features of the method claims may be combined with the device claims according to context, and vice versa.

BRIEF DESCRIPTION OF THE DRAWINGS

The subject-matter of the invention is hereinafter described in more detail by way of preferred embodiment examples which are represented in the accompanying drawings. In each case there are schematically shown in.

Figure 1:
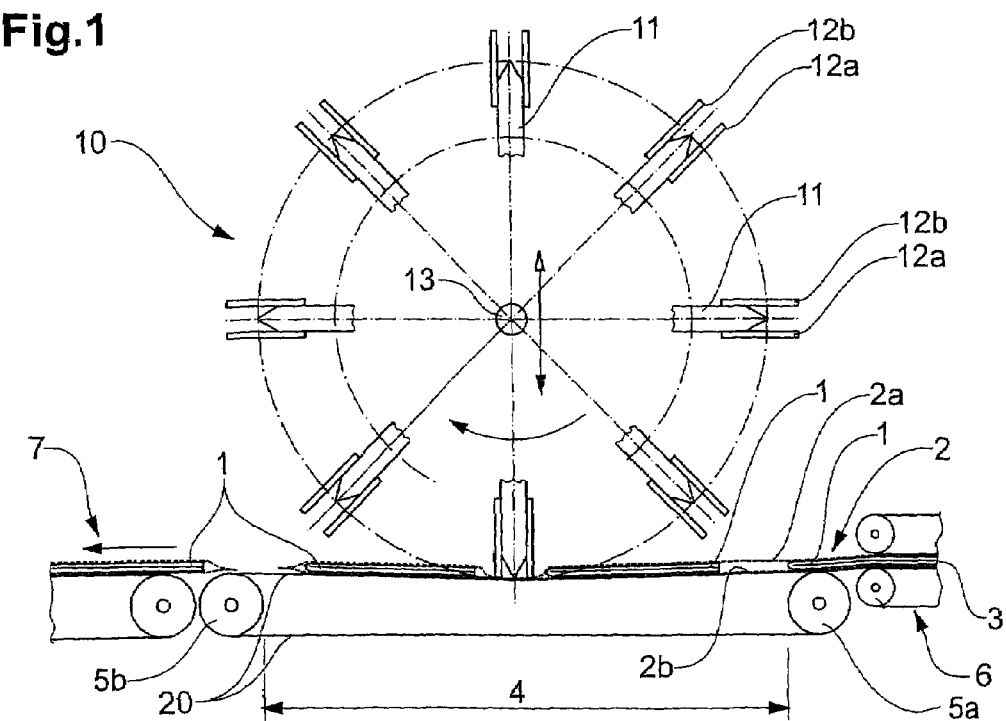
FIG. 1 a lateral section through a device according to the invention.

The reference numerals used in the drawings and their significance are listed in a conclusive manner in the list of reference numerals.

DETAILED DESCRIPTION OF THE INVENTION

FIG. 1 shows a lateral section through a device according to the invention. A row of objects conveyed, one after the other, is at least partly surrounded by packaging material and thus forms a stream of conveyed objects 3. The row is covered by an upper region of the packaging means 2a and lies on a lower region of the packaging means 2b. The stream of conveyed objects 3 is fed by way of a feed 6, led by way of a support belt 20 past a welding rotor 10 for processing, and led away by way of a run-out belt 7. The support belt 20 is led tangentially to the welding rotor 10 by way of a first roller 5a and a second roller 5b. The support belt 20 in the region of the processing by the welding rotor 10, has a non-supported region 4.

What are not drawn are, for example, the means for singularising the objects 1, for wrapping the objects 1 by way of the packaging means 2, for producing one or more longitudinal seams between the upper and the lower region of the packaging means 2a, 2b, etc., said means being arranged beforehand along the stream of conveyed objects 3. An arrangement for singularising the objects 1 is described in detail in a patent application of the same applicant which has the same application date as the present application, and which is particularly suitable in combination with the present invention on account of the high cycle rates which may be attained.

The welding rotor 10 is rotatably arranged about a rotation axis 13, and as processing means comprises several welding beams 11 which project in the radial direction at uniform distances on the periphery of the welding rotor 10. The welding beams are for example fastened in a fixed manner on a mounting 14 or attached on an adjustment means according to the initially mentioned WO 2004 018 297, for variation of the distance amongst one another. In each case, a leading hold-down means 12a and a trailing hold-down means 12b are arranged in a resilient manner on each of the welding beams 11.

Figure 2:
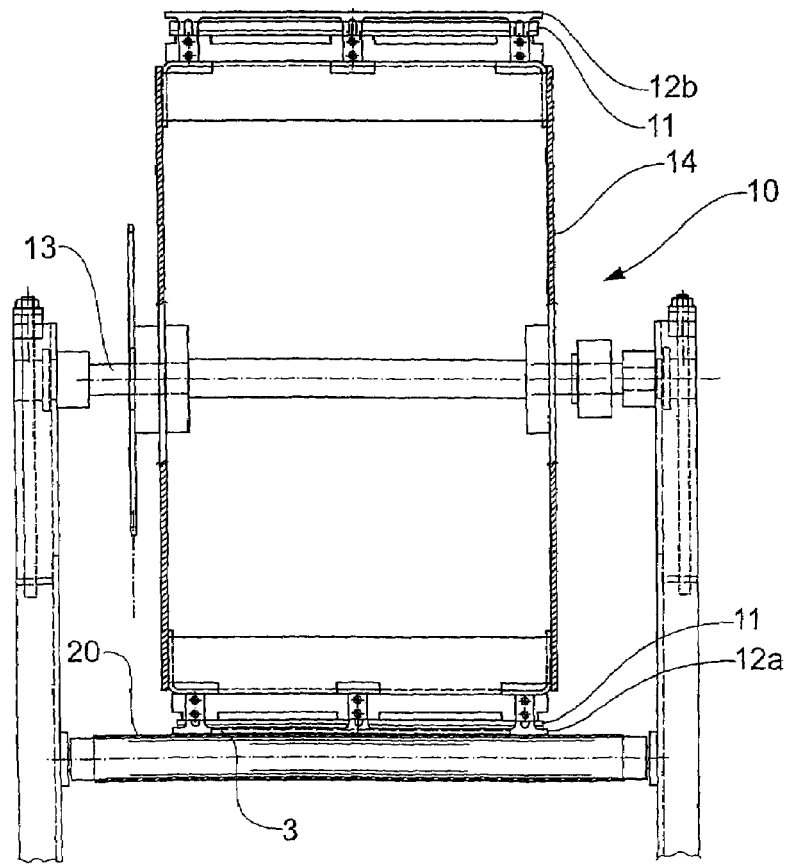
FIG. 2 a cross section through the same device.
Figure 3:
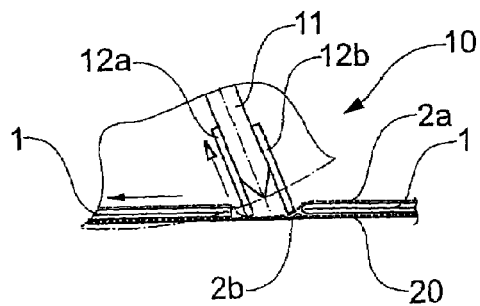
FIGS. 3 to 6 various stages before and after a processing operation.

FIG. 2 shows a cross section through the same device. A trailing hold-down means 12b is visible on the upper edge of the drum, and it projects beyond the associated welding beam 11 in the radial direction. A leading hold-down means 12a is visible in the sprung-in condition on the lower edge.

FIGS. 3 to 6 show various stages of the method according to the invention before and after a processing operation. For the purpose of the explanation, a welding with heated welding beams 11 has been selected as a processing. The basics however also apply analogously to other processing types. According to the movement of the stream of conveyed objects 3 as well as the welding beam 11 from the left to the right, first the leading hold-down means 12a comes into contact with the upper region of the packaging means 2a. In the stage according to FIG. 3, the leading hold-down means 12a has already pressed the upper region of the packaging means 2a against the lower region of the packaging means 2b and begins to spring-in in the direction of the arrow, thus in the radial direction with respect to the welding rotor 10. The trailing hold-down means 12b is already in contact with the upper region of the packaging means 2a.

Figure 4:
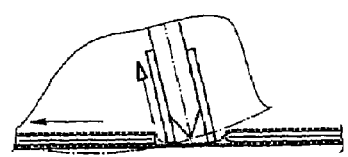
Figure 5:
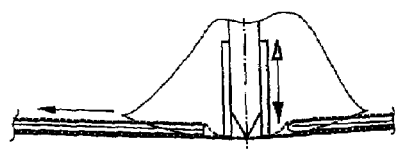

In the stage according to FIG. 4, the trailing hold-down means 12b has also pressed the upper region of the packaging means 2a downwards. The hold-down means fix and stabilize the packaging means 2a, 2b, for example, a plastic film. In the stage according to FIG. 5, the two hold-down means 12a, 12b are sprung-in essentially in the perpendicular direction to the stream of conveyed objects, and the welding beam 11 has come into contact with the stream of conveyed objects 3. The welding beam 11 in this position exerts a maximal pressure against the stream of conveyed objects 3, and the processing takes place, for example welding, pressing and separation. On pressing, one should differentiate between a slight pressing by way of the hold-down means 12a, 12b which brings the packaging means 2a, 2b into a defined position and stabilizes it, and a firmer pressing by way of a pressing bow which creates the connection. The processing also takes place in a region in front of and after the mentioned position of the maximum pressure, in accordance with a compliance of the welding beam 11 and/or of the support belt 20 in the direction of the processing forces, thus, perpendicular to the plane of the support belt 20.

A welding time lies in the region, for example, of 0.05 seconds depending on the temperature and pressing force, with an output of 30,000 units per second and a conveyor speed of 2 m/s. Accordingly, the processing region has a length of approx. 2 cm.

The support belt 20, thus, with the exception of the mentioned compliance which results from the length of the non-supported region of the support belt 4, a belt tension and a compliance of the belt in the running direction, runs essentially in a straight line and tangentially to the revolving path of the outermost edges of the welding beam 11 which by way of this are effective on welding. This is the case inasmuch as no part of the welding beam 11 or the hold-down means 12a, 12b is in contact with the stream of conveyed objects 3. Due to the contact forces with these, and in particular with the welding beam 10, the support belt 20 is pressed away in the radial direction of the welding rotor 10 by a few millimeters, but less than 2 to 3 centimeters.

Figure 6:
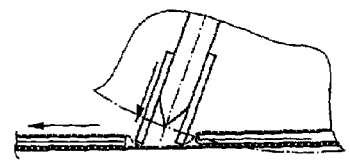

In the stage according to FIG. 6, the welding beam 11 has already distanced itself from the stream of conveyed objects 3, and the leading hold-down means 12a begins to move away. A sticking of parts of the stream of conveyed objects 3 to the welding beam 11 is effectively prevented since the welding beam 11 moves away first of all. The trailing hold-down means 12b is still in contact with the stream of conveyed objects 3 and by way of this supports its conveying. Should at least one longitudinal seam have been previously incorporated for forming a packaging bag, the flat objects 1 are enclosed on all sides by packaging material after the welding.

Figure 7:
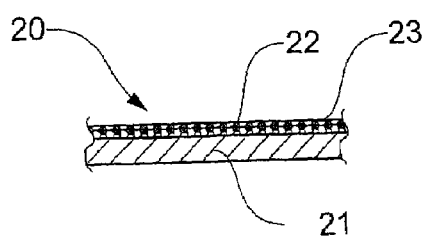
FIG. 7 a construction of a support belt.

FIG. 7 shows a construction of a support belt. A damping layer 22, for example, of felt or of a plastic foam, and thereabove, an outer heat resistant layer 23, are arranged on a base material 21 which accommodates the major tensile forces. The heat-resistant layer 23 preferably has Teflon by which means the sticking of the stream of conveyed objects to the belt is counteracted.

Figure 8:
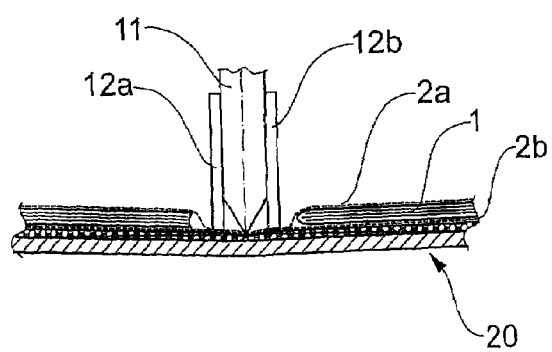
FIG. 8 a deformation of a support belt on operation of the device.

FIG. 8 shows a deformation of a support belt on operation of the device. It is the same stage as FIG. 5 but shown enlarged. The hold-down means 12a, 12b—with packaging means 2a, 2b lying therebetween—penetrate the damping layer 22 to a lesser extent than the welding beam 11 on account of the compliant fastening of the hold-down means 12a, 12b on the welding beam 11. The force necessary for springing-in the hold-down means 12a, 12b is matched to the compliance of the damping layer 22, so that on the one hand an adequate force remains for firmly holding the packaging means 2a, 2b by the hold-down means 12, and on the other hand that the damping layer 22 on account of the hold-down means 12a, 12b is not pressed in as greatly as due to the welding beam 11. With this, a contact surface between the welding beam 11 and the packaging means 2 is increased, and the time duration during this contact is increased.

Figure 9:
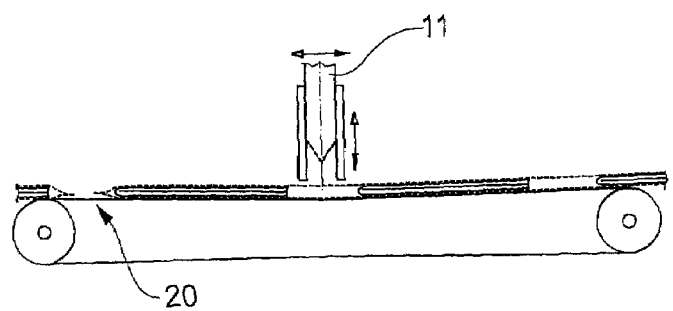
FIG. 9 a manner of operation of a further embodiment of the invention.

FIG. 9 shows a working manner of a further embodiment of the invention. Thereby, the hold-down means 12a, 12b are attached on a welding beam 11 which is moved intermittently, first in the conveying direction along the stream of conveyed objects 3 and in contact with this according to FIG. 8, and subsequently in the vertical direction away from the stream of conveyed objects 3, and then back in the opposite direction along the stream of conveyed objects 3. Although the cycle rate is limited due to the intermittent movement, the advantages from the application of the hold-down means 12, 12b and of the support belt 20 alone or in combination, remain.

With the application of welding beams 11, these, depending on the thickness of the films to be welded, are heated to 300° to 500° Celsius. An electrical power of approx. 500 W per welding beam 11 which is necessary for this is transmitted, for example, via slip rings onto the drum or a movement means for a movement of the welding beam which is not circular.

In one variant of the arrangement according to FIG. 1, the transition between the support belt 20 and the run-out belt 7 lies further to the right, thus upstream, so that a separated, packaged object 1 lies at least partly on the run-out belt 7 directly after the processing by way of a separating welding beam 11. The run-out belt 7 has a slightly greater speed than the support belt 20, so that the stream of conveyed objects 3 is pulled apart by way of extending the distance at the separating locations between the packaged objects.

According to a further preferred embodiment of the invention, the support belt 20 may also be realized by way of several individual belts running parallel next to one another and separated in the transverse direction. By way of this, it becomes possible to carry out a processing only in the region in each case of the individual belts, whilst no processing takes place in an intermediate space between the individual belts.

In yet a further preferred embodiment of the invention, the welding beam 11 or generally the processing means, together with the hold-down means 12a, 12b in the processing region, are moved additionally in the direction of the support belt 20 by way of a suitable device. This device may be activated and moved in a purely mechanical manner on account of the movement of the welding rotor 10, or with other means, for example electromagnetic or pneumatic ones.

LIST OF REFERENCE NUMERALS 1 flat, conveyed object
2 packaging means
2a upper region of the packaging means
2b lower region of the packaging means
3 stream of conveyed objects
4 non-supported region of the support belt
5a, 5b rollers for guiding the support belt
5a first roller for guiding the support belt
5b second roller for guiding the support belt
6 feed
7 run-out belt
10 welding rotor
11 welding beam
12 hold-down means
12a leading hold-down means
12b trailing hold-down means
13 rotation axis
14 mounting, drum
20 support belt
21 base material
22 damping layer
23 heat resistant layer

The invention claimed is:

1. A method for packaging flat objects, comprising the steps of:
    conveying the flat objects (1) in a stream, one after the other and distanced from one another in a packaging web (2a, 2b) in a web direction;
    the packaging web (2a, 2b) covering the flat objects (2) on both sides, and transverse connections between an upper region (2a) and a lower region (2b) of the packaging web are created on the stream of conveyed objects (3), at least between two successive objects (1) by way of a processing means (11), wherein the processing means (11) and the stream of conveyed objects (3) are moved essentially at the same speed in the same direction, wherein, within this step:
        with a movement of the processing means (11) to the stream of conveyed objects (3), a first hold-down means (12a) resiliently connected to the processing means (11), presses and moves the upper region of the packaging web (2a) against the lower region of the packaging web (2b); and
        subsequently the processing means (11) presses the upper region of the packaging web (2a) against the lower region of the packaging web (2b) and thereby carries out a processing operation;
    wherein by way of the pressing of the processing means (11) against the upper and lower regions of the packaging web (2), the packaging web (2) is pressed against a support belt (20) which carries and conveys the stream of conveyed objects (3) in the region of the processing, and wherein the support belt runs essentially in a straight line.

2. The method according to claim 1, wherein the first hold-down means (12a) is arranged in the direction of movement, in front of the processing means (11) and a second hold-down means (12b) is arranged, in the direction of movement, behind the processing means (11), and the first and second hold-down means, are resiliently connected to the processing means (11), and press the upper region of the packaging web (2a) against the lower region of the packaging web (2b) before and whilst the processing means (11) carries out the processing operation.

3. The method according to claim 1, wherein the support belt (20) is deflected by a force exerted by the processing means (11).

4. The method according to claim 1, wherein the support belt (20) comprises a damping layer (22) that is compressed by a force exerted by the processing means (11).

5. The method according to claim 1, wherein the processing means is deflected with regard to its mounting (14) by way of the pressing of the processing means (11) against the upper and the lower region of the packaging web (2).

6. The method according to claim 1, wherein several processing means (11) in each case in a uniform movement are led past an initial position to the stream of conveyed objects (3) at essentially the speed of the stream of conveyed objects (3), the processing operation is carried out, and subsequently the processing means (11) on a return path are led back again past the initial position.

7. The method according to claim 6, wherein at every point in time, maximally one processing means (11) is in contact with the packaging web on the stream of conveyed objects (3) for carrying out a processing operation.

8. The method according to claim 7, wherein the processing means (11) are assembled on a drum (14) and are moved in a circular path, and a conveying direction of the stream of conveyed objects (3) runs essentially tangentially to this circular path.

9. The method according to claim 1, wherein the processing operation comprises at least one of the operations of thermal welding, ultrasonic welding, pressing pre-glued locations, and separation.

10. The method of claim 1, wherein the support belt by way of a first roller and a second roller is guided essentially tangentially to the outermost edges of the processing means.

11. The method of claim 10, wherein only one processing means at a time is in contact with the packaging web on the stream of conveyed objects.

12. A method for packaging flat objects, comprising the steps of:
conveying the flat objects (1) in a stream, one after the other and distanced from one another in a packaging web (2a, 2b) in a web direction;
the packaging web (2a, 2b) covering the flat objects (2) on both sides, and transverse connections between an upper region (2a) and a lower region (2b) of the packaging web are created on the stream of conveyed objects (3) at least between two successive objects (1) by way of a processing means (11), wherein the processing means (11) and the stream of conveyed objects (3) are moved essentially at the same speed in the same direction, wherein, within this step:
with a movement of the processing means (11) to the stream of conveyed objects (3), a first hold-down means (12a) presses and moves the upper region of the packaging web (2a) against the lower region of the packaging web (2b); and
subsequently the processing means (11) presses the upper region of the packaging web (2a) against the lower region of the packaging web (2b) and thereby carries out a processing operation
wherein by way of the pressing of the processing means (11) against the upper and lower regions of the packaging web (2), the packaging web (2) is pressed against a support belt (20) which carries and conveys the stream of conveyed objects (3) in the region of the processing, and wherein the support belt runs essentially in a straight line.

13. A device for packaging flat objects, comprising
a conveyor means for conveying flat objects (1) in a stream, one after the other and distanced from one another, in a packaging means web (2a, 2b) in a web direction, wherein the packaging web (2a, 2b) covers the flat objects (1) on both sides,
a processing means (11) for the creation of transverse connections between an upper region (2a) and a lower region (2b) of the packaging web on the stream of conveyed objects (3) at least between two successive objects (1),
a movement means (14) for moving the processing means (11) in a processing region at essentially the same speed and in the same direction as the stream of conveyed objects (3), and
a support belt (20) running essentially in a straight line for conveying the stream of conveyed objects (3) in the processing region and for producing a force counter to the forces exerted by the hold-down means (12a, 12b) and the processing means (11) onto the packaging web on the stream of conveyed objects (3)
wherein a first hold-down means (12a) is resiliently connected to the processing means (11),
wherein a first hold-down means (12a) is designed for holding down the packaging web (2) by way of exerting a force onto an upper region of the packaging web (2a) and by way of this onto a lower region of the packaging web (2b) before the processing means (11) carries out a processing operation, and
wherein during the subsequent processing operation, the processing means (11), whilst exerting a force, presses onto an upper region of the packaging web (2a) and by way of this onto a lower region of the packaging web (2b).

14. The device according to claim 13, wherein the processing means (11) is arranged between the first hold-down means (12a) and a second hold-down means (12b) which is likewise connected resiliently to the processing means (11), said first and second hold-down means (12a, 12b) both being designed for holding down the packaging web (2) before and during the processing by the processing means (11).

15. The device according to claim 13, wherein the support belt (20) comprises a compliant damping layer (22).

16. The device according to claim 13, wherein the support belt (20) on an outer side has a heat-resistant layer (23).

17. The device according to claim 13, wherein the processing means (11) is fastened on the movement means (14) by way of a connection, said connection being compliant in a direction running essentially perpendicular to the movement direction of the processing means (11).

18. The device according to claim 13, wherein the movement means (14) is designed for the uniform movement of a plurality of processing means (11) along a revolving path, said revolving path bringing the processing means (11) into contact with the packaging web on the stream of conveyed objects (3) in the processing region.

19. The device according to claim 18, wherein the processing means (11) are assembled on a drum and are movable in a circular path, and a conveying direction of the stream of conveyed objects (3) runs essentially tangentially to this circular path.

20. The device according to claim 13, wherein the processing means is one of a welding beam, a pressing bow or an ultrasonic welding apparatus.

21. The device of claim 13, wherein the support belt by way of a first roller and a second roller is guided essentially tangentially to the outermost edges of the processing means.

22. The device of claim 21, wherein only one processing means at a time is in contact with the packaging web on the stream of conveyed objects.

23. A device for packaging flat objects, comprising
a conveyor means for conveying flat objects (1) in a stream, one after the other and distanced from one another, in a packaging web (2a, 2b) in a web direction, wherein the packaging web (2a, 2b) covers the flat objects (1) on both sides,
a processing means (11) for the creation of transverse connections between an upper region (2a) and a lower region (2b) of the packaging web on the stream of conveyed objects (3) at least between two successive objects (1), and a movement means (14) for moving the processing means (11) in a processing region at essentially the same speed and in the same direction as the stream of conveyed objects (3), a support belt (20) running essentially in a straight line for conveying the stream of conveyed objects (3) in the processing region and for producing a force counter to the forces exerted by a first hold-down means (12*a*) and the processing means (11) onto the packaging web on the stream of conveyed objects (3), wherein a first hold down means (12*a*) is designed for holding down the packaging web (2) by way of exerting a force onto an upper region of the packaging web (2*a*) and by way of this onto a lower region of the packaging means (2*b*) before the processing means (11) carries out a processing operation, and wherein during the subsequent processing operation, the processing means (11), whilst exerting a force, presses onto an upper region of the packaging web (2*a*) and by way of this onto a lower region of the packaging web (2*b*).

\* \* \* \* \*